United States Patent
Zhou

(10) Patent No.: US 10,153,095 B2
(45) Date of Patent: Dec. 11, 2018

(54) ULTRA-CAPACITY BATTERY

(71) Applicants: Semiconductor Manufacturing International (Shanghai) Corporation, Shanghai (CN); Semiconductor Manufacturing International (Beijing) Corporation, Beijing (CN)

(72) Inventor: Ming Zhou, Shanghai (CN)

(73) Assignees: SEMICONDUCTOR MANUFACTURING INTERNATIONAL (SHANGHAI) CORPORATION, Shanghai (CN); SEMICONDUCTOR MANUFACTURING INTERNATIONAL (BEIJING) CORPORATION, Beijing (CN)

( * ) Notice: Subject to any disclaimer, the term of this patent is extended or adjusted under 35 U.S.C. 154(b) by 97 days.

(21) Appl. No.: 15/283,944

(22) Filed: Oct. 3, 2016

(65) Prior Publication Data

US 2017/0169958 A1 Jun. 15, 2017

(30) Foreign Application Priority Data

Dec. 11, 2015 (CN) .......................... 2015 1 0924181

(51) Int. Cl.
*H01G 11/32* (2013.01)
*H01G 11/58* (2013.01)
*H01G 11/26* (2013.01)
*H01G 11/74* (2013.01)
(Continued)

(52) U.S. Cl.
CPC ............ *H01G 11/32* (2013.01); *H01G 11/26* (2013.01); *H01G 11/28* (2013.01); *H01G 11/36* (2013.01);
(Continued)

(58) Field of Classification Search
None
See application file for complete search history.

(56) References Cited

U.S. PATENT DOCUMENTS 552,220 A * 12/1895 Wiiliams .............. H01M 10/18
429/210
4,100,332 A * 7/1978 Carr .................... H01M 8/2455
429/210
(Continued)

OTHER PUBLICATIONS

European Application No. 16203097.7, Extended European Search Report dated May 23, 2017, 5 pages.

*Primary Examiner* — Dion R Ferguson
(74) *Attorney, Agent, or Firm* — Kilpatrick Townsend & Stockton LLP

(57) ABSTRACT

An ultra-capacitor battery includes multiple cathodes, each including a first substrate having a first surface and a second opposite surface, multiple first combs are arranged perpendicularly to the first surface of the first substrate in the same direction at a first interval, and a graphene layer on the first combs and on the first substrate. The battery also includes multiple anodes, each including a body portion and multiple second combs arranged perpendicularly to the body portion in the same direction at a second interval. The first and second combs are interspersed between each other, and an air gap is between the interspersed first and second combs. An insulting film is disposed at the distal end surface of each of the second combs. The battery also includes a hermetically sealed contained enclosing the cathodes and the anodes, and an electrolyte solution filling the air gap and the container.

11 Claims, 8 Drawing Sheets

(51) Int. Cl.
 *H01G 11/80* (2013.01)
 *H01G 11/86* (2013.01)
 *H01G 11/28* (2013.01)
 *H01G 11/36* (2013.01)
 *H01G 11/70* (2013.01)
 H01G 11/62 (2013.01)

(52) U.S. Cl.
 CPC ............. *H01G 11/58* (2013.01); *H01G 11/70* (2013.01); *H01G 11/74* (2013.01); *H01G 11/80* (2013.01); *H01G 11/86* (2013.01); H01G 11/62 (2013.01); Y02E 60/13 (2013.01)

(56) References Cited

U.S. PATENT DOCUMENTS

| | | | |
|---|---|---|---|
| 9,437,369 B2* | 9/2016 | Miller | H01G 11/28 |
| 2003/0227664 A1* | 12/2003 | Agrawal | G02F 1/1523 |
| | | | 359/269 |
| 2009/0052110 A1* | 2/2009 | Masuda | H01G 4/005 |
| | | | 361/303 |
| 2009/0154054 A1* | 6/2009 | Masuda | H01G 4/005 |
| | | | 361/275.1 |
| 2011/0227000 A1* | 9/2011 | Ruoff | B82Y 30/00 |
| | | | 252/502 |
| 2012/0170171 A1* | 7/2012 | Lee | H01G 11/36 |
| | | | 361/502 |
| 2013/0052547 A1 | 2/2013 | Ogino et al. | |
| 2013/0149605 A1 | 6/2013 | Kakehata et al. | |
| 2013/0182373 A1 | 7/2013 | Yu et al. | |
| 2014/0272564 A1 | 9/2014 | Holme et al. | |
| 2016/0133396 A1* | 5/2016 | Hsieh | H01G 11/38 |
| | | | 361/502 |

* cited by examiner

ULTRA-CAPACITY BATTERY

CROSS-REFERENCES TO RELATED APPLICATIONS

The present application claims priority to Chinese patent application No. 201510924181.1, filed with the State Intellectual Property Office of People's Republic of China on Dec. 11, 2015, the content of which is incorporated herein by reference in its entirety.

FIELD OF THE INVENTION

The present invention relates to batteries, and more particularly to a ultra-capacitor battery and method for manufacturing the same.

BACKGROUND OF THE INVENTION

A ultra-capacitor battery is a new energy storage device having a short charging time, high efficiency, long life, good temperature characteristic, excellent energy conservation and environmental protection features. It has found a wide range of applications, especially in the accumulation and storage of energy reserves in the area of heavy-duty energy consumption. In recent years, ultra-capacitor technology has attracted wide attention and research interests around the world.

Graphene is the thinnest and hardest nanomaterial. Graphene is almost transparent and absorbs only 2.3% of visible light per layer. Its thermal conductivity of 5300 W/m.K is higher than those of carbon nanotubes and diamond, the electron mobility is over 1500 cm2/V.s at room temperature, which is higher than those of carbon nanotubes and silicon. The resistivity of graphene is about 1Ω.m, which is lower than that of copper or silver. Graphene is thus the material having the lowest resistivity. Because of the lowest resistivity and high electron mobility, graphene is expected to be used in the development of the new generation of electronic devices and transistors.

Embodiments of the present invention provide a novel structure of an ultra-capacitor battery and method for manufacturing the same based on the superior characteristics of graphene.

BRIEF SUMMARY OF THE INVENTION

Embodiments of the present invention provide an ultra-capacitor battery. The ultra-capacitor battery includes a plurality of cathodes, each of the cathodes includes a first substrate having a first surface and a second surface opposite the first surface, a plurality of first combs extending perpendicularly to the first surface of the first substrate and arranged in a first direction at a first interval. The battery also includes a graphene layer on a surface of the first combs and on the first surface of the first substrate, a plurality of anodes, each of the anodes includes a body portion and a plurality of second combs extending perpendicularly to a first side of the body portion and arranged in a second direction at a second interval. The first and second combs are interspersed between each other, and the first and second direction are parallel to each other. The battery further includes an air gap between the interspersed first and second combs, an insulting film on a distal end portion of each of the second combs, a hermetically sealed container enclosing the cathodes and the anodes, and an electrolyte solution filling the air gap and the container.

In one embodiment, the ultra-capacitor battery further includes a plurality of third combs extending perpendicularly to the second surface of the first substrate and arranged in the first direction. The graphene layer is disposed on a surface of the third combs and on the second surface of the first substrate.

In one embodiment, the number of the third combs is equal to the number of the first combs.

In one embodiment, the ultra-capacitor battery also includes a plurality of fourth combs extending perpendicular to a second side of the body portion and arranged in the second direction, the second side is opposite to the first side, and the insulting film is disposed at a distal end portion of each of the fourth combs.

In one embodiment, the number of the fourth combs is equal to the number of the second combs.

In one embodiment, the width of a first comb is smaller than the second interval, and the width of a second comb is smaller than the first interval.

In one embodiment, each of the first substrate, the first combs, and the third combs includes a material selected from the group consisting of Cu, Si, SiC and Sn.

In one embodiment, the graphene layer includes a multilayer graphene, or a mixture of graphene and graphite.

In one embodiment, the electrolyte solution includes imidazole-Al2Cl7, pyridine-Al2Cl7, or a combination thereof.

In one embodiment, the anodes include a metal material. In one embodiment, the metal material is aluminum.

Embodiments of the present invention also provide a method for manufacturing an ultra-capacitor battery. The method may include preparing a plurality of cathodes and a plurality of anodes. Preparing the cathodes may include the following steps: providing a first substrate having a first surface and a second surface opposite the first surface, forming a plurality of first combs perpendicular to the first surface of the first substrate and arranged at a first interval along a first direction, forming a graphene layer on the first combs and on the first surface of the first substrate.

Preparing the anodes may include the following steps: providing a second substrate having a first surface and a second surface, forming a patterned insulating film on the first surface of the second substrate exposing a portion of the first surface of the second substrate, etching the exposed portion of the first surface of the second substrate to form a body portion and a plurality of second combs perpendicular to the body portion. The second combs are arranged at a second interval along a second direction, and the first and second direction are parallel to each other.

The method also includes providing a hermetically sealed container enclosing the cathodes and the anodes. The first combs and the second combs are interspersed between each other and have an air gap between them. The method further includes filling the container and the air gap with an electrolyte solution.

In one embodiment, forming the first combs includes forming a first hardmask layer on the first surface of the first substrate, patterning the first hardmask layer to form a plurality of first openings, filling the first openings with a first comb material to form the first combs, and removing the first hardmask layer.

In one embodiment, the method further includes forming a second hardmask layer on the second surface of the first substrate, patterning the first hardmask layer to form a plurality of second openings, filling the second openings with a third comb material to form a plurality of third combs, and removing the second hardmask layer.

In one embodiment, the method also includes forming the graphene layer on the third combs and on the second surface of the first substrate.

In one embodiment, forming the patterned insulating film on the first surface of the second substrate also includes forming the patterned insulating film on the second surface of the second substrate exposing a portion of the second surface of the second substrate. The method further includes anisotropic etching the exposed portion of the second surface of the second substrate vertically to a depth to form a plurality of fourth combs extending perpendicularly to the body portion.

In one embodiment, the number of the fourth combs is equal to the number of the second combs

DETAILED DESCRIPTION OF THE INVENTION

Figure 1:
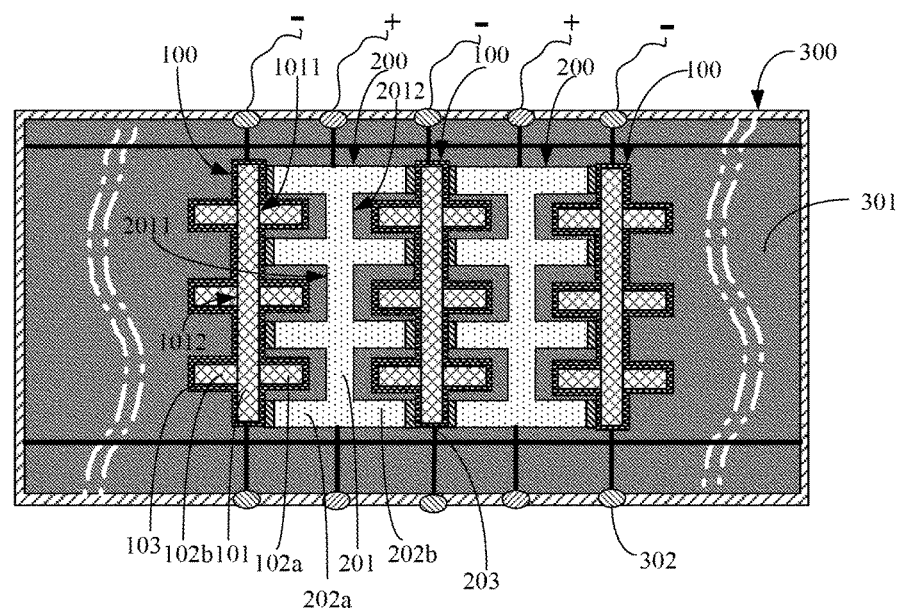
FIG. 1 is a plan view of an ultra-capacitor battery according to an embodiment of the present invention.

Embodiments of the present invention now will be described more fully hereinafter with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. The features may not be drawn to scale, some details may be exaggerated relative to other elements for clarity. Like numbers refer to like elements throughout.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The use of the terms first, second, etc. do not denote any order, but rather the terms first, second, etc. are used to distinguish one element from another. Furthermore, the use of the terms a, an, etc. does not denote a limitation of quantity, but rather denote the presence of at least one of the referenced items.

Relative terms such as "under," "below," "underneath," "over," "on," "above," "bottom," and "top" are used herein to described a relationship of one element, layer or region to another element, layer or region as illustrated in the figures. It will be understood that these terms are intended to encompass different orientations of the structure in addition to the orientation depicted in the figures. For example, if the device shown in the figures is flipped, the description of an element being "below" or "underneath" another element would then be oriented as "above" the other element. Therefore, the term "below," "under," or "underneath" can encompass both orientations of the device. Because devices or components of embodiments of the present invention can be positioned in a number of different orientations (e.g., rotated 90 degrees or at other orientations), the relative terms should be interpreted accordingly.

The terminology used herein is for the purpose of describing particular embodiments only and is not intended to be limiting of the invention. As used herein, the singular forms "a", "an", and the are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

As used herein, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any possible combinations of one or more of the associated listed items.

Embodiments of the invention are described herein with reference to cross-sectional illustrations that are schematic illustrations of idealized embodiments (and intermediate structures) of the invention. The thickness of layers and regions in the drawings may be enlarged relative to other layers and regions for clarity. Additionally, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a discrete change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein.

Embodiment 1

FIG. 1 is a plan view of an ultra-capacitor cell structure according to an embodiment of the present invention. As shown, the ultra-capacitor includes a plurality of cathodes 100, each of the cathodes includes a first substrate 101 having a first surface 1011, a plurality of first combs (interdigital teeth) 102a disposed perpendicularly to the first surface 1011 and arranged at intervals along a first direction, and a graphene layer 103 on the surface of combs 102a and the first surface 1011 of substrate 101.

It is worth noting that first combs 102a can have a rectangular parallelepiped shape or they can be shaped like a cube. In the exemplary embodiment, the combs may have a shape identical or similar to first combs 102a, as shown in FIG. 1.

In an exemplary embodiment, the ultra-capacitor includes a plurality of third combs 102b disposed on a second surface 1012 opposite first surface 1011, third combs 102b are formed perpendicularly to second surface 1012 and arranged at same intervals and along the same direction as those of first combs 102a. Graphene layer 103 is disposed on the surface of each of third combs 102b and the second surface 1012 of the substrate 101 surface In some embodiments, the number of third combs 102b is equal to the number of first combs 102a. In addition, first combs 102a and third combs 102b may have the same size.

In other embodiments, the number of third combs 102b and the number of first combs 102a may differ.

In an exemplary embodiment, the material of first substrate 101, first combs 102a, and third combs 102b may be selected from the group consisting of Cu, Si, SiC and Sn. In the example embodiment, first substrate 101, first combs 102a, and third combs 102b have the same material. In a preferred embodiment, the material of first substrate 101, first combs 102a, and third combs 102b is Cu.

Furthermore, graphene layer 103 may be a multilayer graphene or a compound of graphite and graphene. The multilayer graphene refers to a 3-10 layer benzene-ring structure (i.e., a hexagonal honeycomb structure) of periodic layers of densely packed carbon atoms of a two-dimensional carbon material stacked on top of each other in different hexagonally-packed configurations (e.g., the ABC stacking, ABA stacking, etc.). In the embodiment, the number of multilayer graphene can have up to 10 layers.

In the embodiment, the ultra-capacitor includes a plurality of anodes 200. Anodes 200 include a body portion 201 and a plurality of second combs 202a disposed perpendicular to a side 2011 of body portion 201. Second combs 202a are arranged at a second interval along the same first direction. An insulating film 203 is disposed on the outer end face of second combs 202a.

In addition, a plurality of fourth combs 202b are formed on a second side 2012 of body portion 201 of each of anodes 200, second side 2012 is opposite first side 2011. Fourth combs 202b are arranged along the same direction as first combs 202a. Insulating film 203 is disposed on the outer end face of fourth combs 202b.

In addition, the number of fourth combs 102a is equal to the number of second combs 202b. In a preferred embodiment, fourth combs 202a and second combs 202b have the same size.

The metal material of anodes 200 may include, but not limited to, gold, silver, aluminum, cupper, tin, etc. In the embodiment, anodes 200 include aluminum.

Insulating film 203 insulates the end surfaces of anodes 200 and cathodes 100. Insulating film 203 may be an inorganic layer, such as a silicon oxide layer, a silicon nitride layer, or a silicon oxynitride layer. Insulating film 203 may also be an organic insulting layer having an insulating effect. In the embodiment, insulating film 203 is a silicon nitride layer.

The ultra-capacitor may further include a sealed box 300 configured to be a sealed contained for the ultra-capacitor. Anodes 200 and cathodes 100 are alternatively arranged, and the combs of anodes 200 and cathodes 100 intersect to each others and are separated by an air gap.

The width of a space between two adjacent second combs 202a is greater than the sum of the width of a space between two adjacent first combs 102a and two times the thickness of graphene layer 103.

In an exemplary embodiment, the sealed box 300 includes an electrolyte solution 301 filled the air gaps between the intersecting combs of cathodes 200 and anodes 100. Electrolyte solution 301 may be any suitable electrolyte solution known in the art. In a preferred embodiment, electrolyte solution 301 includes imidazole-$Al_2Cl_7$ and/or pyridine-$Al_2Cl_7$.

The ultra-capacitor according to the present invention may be an Al ultra-capacitor, which include generally an anode made of an aluminum material. The ultra-capacitor of the present invention is a passive device having characteristics of fast charge-discharge times, high energy storage capability and long cycle life. The ultra-capacitor delivers an electric current to power equipment by moving electrons between conductors (anode and cathode)

In summary, embodiments of the present invention provide an ultra-capacitor battery having an anode and a cathode that include intersecting comb-like structures, so that the distance between the anode and the cathode is significantly reduced, a graphene layer is deposited on the comb-shaped substrate for the cathode, which improves the capacitance density and the performance of the ultra-capacitor battery.

Embodiment 2

A method for manufacturing an ultra-capacitor battery will be described below with reference to FIG. 1, FIGS. 2A through 2I, FIGS. 3A through 3E and FIG. 4. FIGS. 2A through 2I are cross-sectional views of intermediate stages of an ultra-capacitor device of a manufacturing method according to an embodiment of the present invention. FIGS. 3A through 3E are cross-sectional views of intermediate stages of an ultra-capacitor device of a manufacturing method according to another embodiment of the present invention. FIG. 4 is a simplified flowchart of a method for manufacturing an ultra-capacitor battery according to an embodiment of the present invention.

Referring to FIG. 4, a method for manufacturing an ultra-capacitor battery may include:

S401: providing a plurality of cathodes and a plurality of anodes.

Figure 2A:
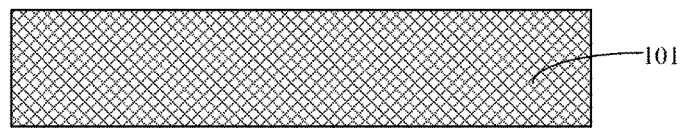
FIGS. 2A through 2I are cross-sectional views of intermediate stages of a manufacturing method of cathodes of an ultra-capacitor according to an embodiment of the present invention.

In an embodiment, providing the cathodes may include: providing a substrate 101 having a front side and a back side opposite the front side, as shown in FIG. 2A. The material of substrate 101 may be selected from the group consisting of Cu, Si, SiC, and Sn. In a preferred embodiment, the material of substrate 101 is Cu.

Figure 2B:
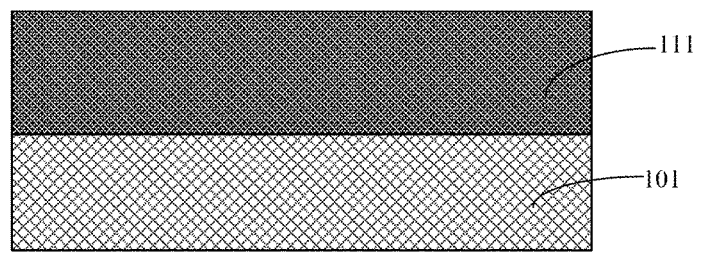

Next, referring to FIG. 2B, a first hardmask layer 111 is formed on the front side of substrate 101. The material of first hardmask layer 111 may include, but is not limited to, silicon oxide, silicon nitride, or silicon oxynitride, and the like, In a preferred embodiment, first hardmask layer 111 is a TEOS silicon oxide. The material of first hardmask layer 111 can be formed using a conventional deposition process, such as a chemical vapor deposition (CVD), a physical vapor deposition (PVD), an atomic layer deposition (ALD) process, etc. The thickness of first hardmask layer 111 is substantially equal to a predetermined height of the comb-shaped cathode.

Figure 2C:
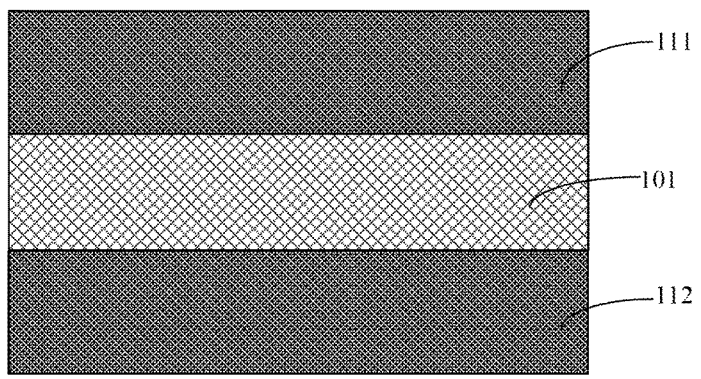

In an exemplary embodiment, as shown in FIG. 2C, a second hardmask layer 112 is formed on the backside of substrate 101. Second hardmask layer 112 is used to form a comb-shaped configuration on the backside of substrate 101. The material of second hardmask layer 112 may be the same of different from that of first hardmask layer 111. In the embodiment, the material of second hardmask layer 112 may be a TEOS silicon oxide.

Figure 2D:
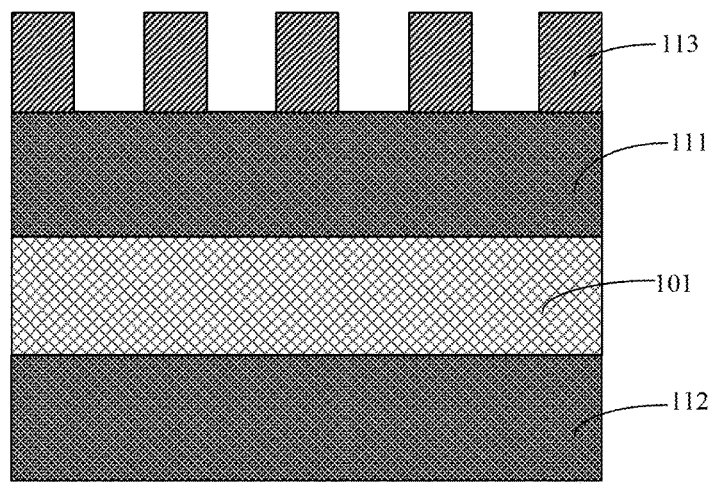
Figure 2E:
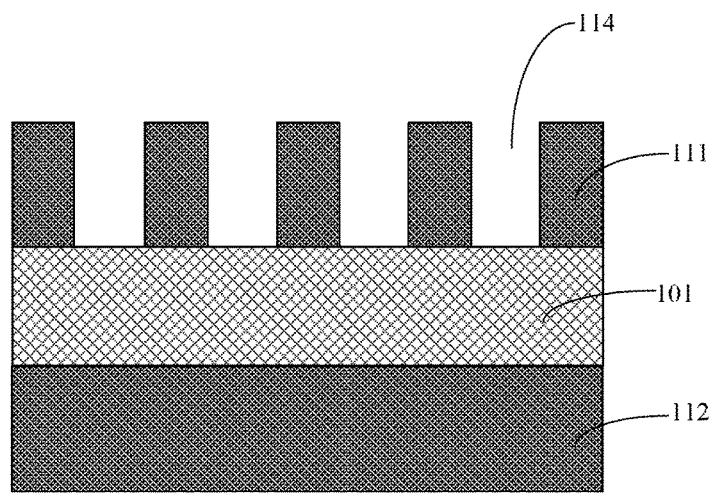

Next, referring to FIGS. 2D and 2E, first hardmask layer 111 is patterned. Illustratively, as shown in FIG. 2D, a photoresist layer is formed by spin coating and patterned through a photolithography process, e.g., expose portions of the photoresist layer to radiation and develop the exposed portions, to form a patterned photoresist 113. First hardmask layer 111 is then etched using a dry etching or a wet etching process using patterned hardmask 113 as a mask to form a plurality of openings 114, as shown in FIG. 2E. Openings 114 and the to-be-formed first combs 102a have the same predetermined size.

Figure 2F:
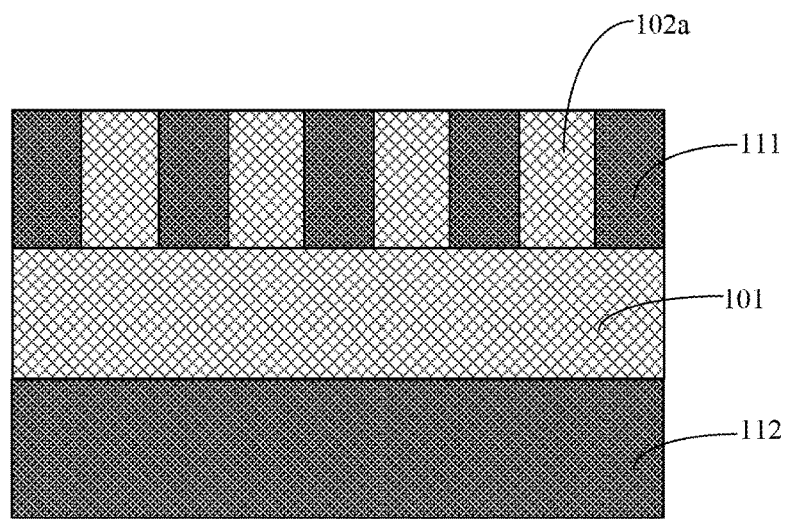

Next, referring to FIG. 2F, openings 114 are filled with a first comb material layer to form the plurality of first combs 102a.

In an embodiment, the first comb material layer is formed in openings 114 and on a surface of hardmask layer 111, a chemical mechanical polishing process is performed on the first comb material layer until the surface of hardmask layer 111 is exposed to form first combs 102. The material of first combs a02a may be selected from the group consisting of Cu, Si, SiC, and Sn. In a preferred embodiment, the material of first combs 102a is Cu. The first comb layer may be deposited using a physical vapor deposition (PVD), a chemical vapor deposition process (CVP) or electrochemical plating (ECP) process.

Figure 2G:
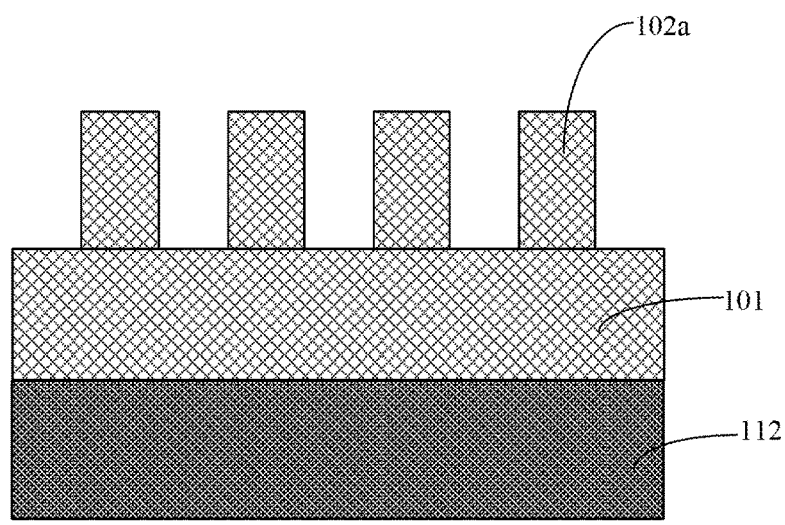

Next, referring to FIG. 2G, hardmask layer 111 is removed.

The removal of hardmask layer 111 may include a dry etching process, a wet etching process or a combination thereof depending on the material of hardmask layer 111. Dry etching may use an anisotropic etching including a carbon fluoride gas. Wet etching may use a hydrofluoric acid solution, such as a buffer oxide etchant (BOE) or a hydrofluoric acid buffer solution such as a buffer solution of hydrofluoric acid (BHF). First combs 102a are formed in the same direction and spaced at predetermined intervals. The predetermined intervals are greater than the width of the combs of the anode.

Figure 2H:
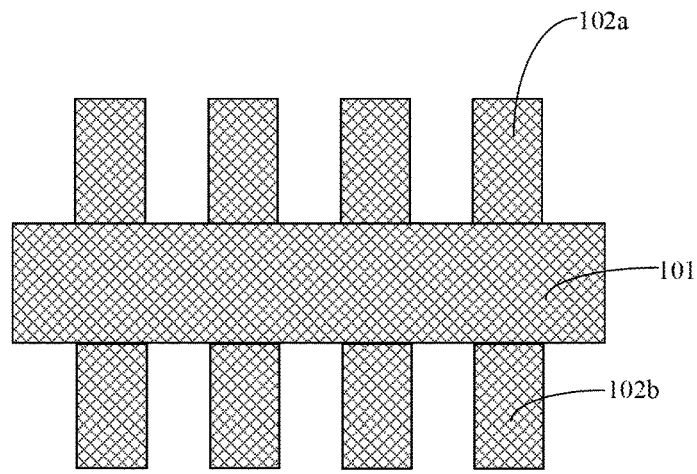

Next, referring to FIG. 2H, a plurality of third combs 102b may be formed using substantially the same process for forming the plurality of first combs 102a. Illustratively, third coms 102 may be formed by etching second hardmask layer 112 to form a plurality of openings, filling the openings with a third comb material layer to form the first combs, then removing hardmask layer 112.

In some embodiments, the number of third combs 102b is equal to the number of first combs 102a. In addition, first combs 102a and third combs 102b may have the same size.

In other embodiments, the number of third combs 102b and the number of first combs 102a may differ.

The material of third combs 102b may be selected from the group consisting of Cu, Si, SiC, and Sn. In an embodiment, first substrate 101, first combs 102a, and third combs 102b have the same material. In a preferred embodiment, first substrate 101, first combs 102a, and third combs 102b are made of Cu.

Figure 2I:
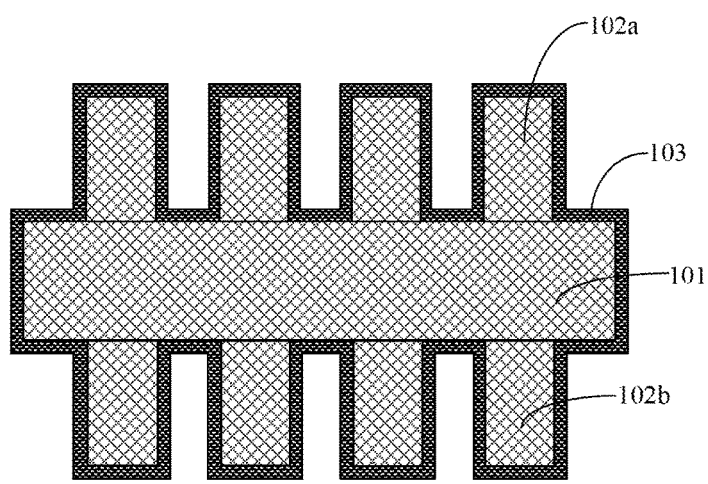

Finally, referring to FIG. 2I, a graphene layer 103 is formed on the surface of first combs 102a, on the surface of third combs 102b, and on the front side surface and backside surface of first substrate 101.

In some embodiments, graphene layer 103 may be a multilayer graphene or a compound of graphite and graphene. The multilayer graphene refers to a 3-10 layer benzene-ring structure (i.e., a hexagonal honeycomb structure) of periodic layers of close-packed carbon atoms of a two-dimensional carbon material stacked on top of each other in different hexagonally-packed configurations (e.g., the ABC stacking, ABA stacking, etc.) (e.g., ABC stacking, ABA stacking, etc.). In the embodiment, the number of multilayer graphene can have up to 10 layers.

The growth of a graphene film may include, but is not limited to, a silicon carbide epitaxial growth process, an organic synthesis, a chemical vapor deposition (CVD), or an atmospheric pressure chemical vapor deposition (APCVD) process, etc. The chemical vapor deposition process may include conducting a pyrolysis process on the surface of the cathode in a reaction chamber and flowing a gaseous carbon source over the cathode surface to grow a multilayer graphene film on the surface of the first combs, the surface of the second combs and on the surface of the substrate. The gaseous carbon source may include methane ($CH_4$), ethylene ($C_2H_4$), acetylene ($C_2H_2$), and the like. The process temperature may be in the range between 600° C. and 1200° C. When the process temperature is in the range between 900° C. and 1000° C., the multilayer graphene film can grown up to 10 layers. When the process temperature is in the range between 600° C. and 900° C., a mixture of graphene and graphite is formed. The mixture of graphene and graphite is prone to defects, so that an electrolyte solution such as Al3+ ions can easily penetrated into the mixture The cathodes of the ultra-capacitor can thus be provided based on the above-described process steps.

Figure 3A:
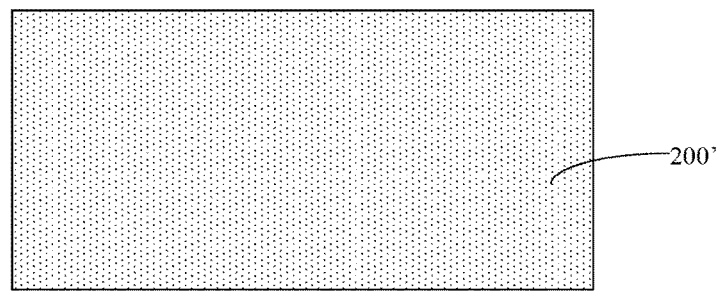
FIGS. 3A through 3E are cross-sectional views of intermediate stages of a manufacturing method of anodes of an ultra-capacitor according to an embodiment of the present invention.
Figure 4:
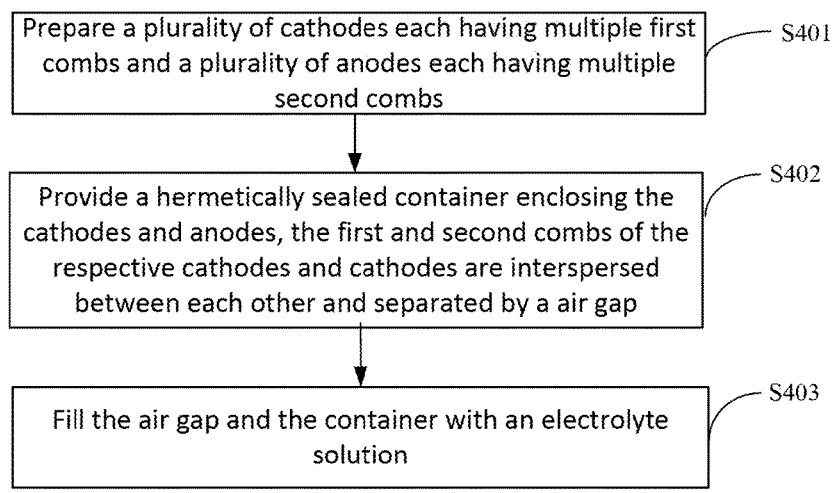
FIG. 4 is a flowchart of a manufacturing method of an ultra-capacitor battery according to an embodiment of the present invention.

In an embodiment, providing the anodes may include: providing a second substrate 200' having a front side and a backside opposite the front side, as shown in FIG. 3A.

Second substrate 200' may include an electric conductive material, such as a metal material, e.g., Al, Cu, Ag, etc. In a preferred embodiment, the material of second substrate 200' is aluminum (Al).

Figure 3B:
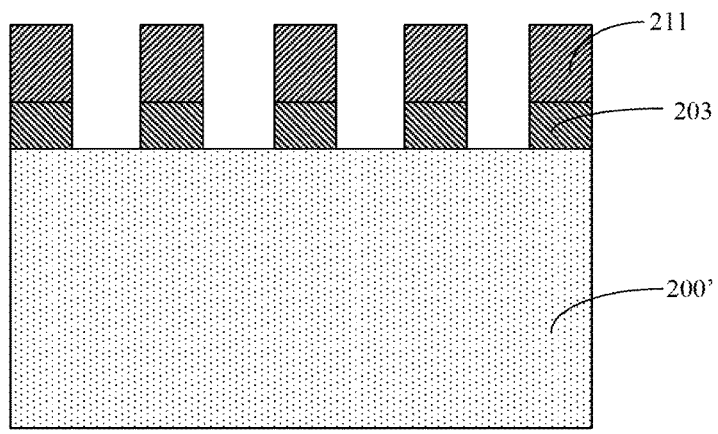

Next, referring to FIG. 3B, a patterned insulating film 203 is formed on the front side of second substrate 200'.

Insulating film 203 may be an organic insulating layer such as a silicon oxide layer, a silicon nitride layer, or a silicon oxynitride layer. Insulating film 203 may also be an inorganic insulating layer. In a preferred embodiment, insulating layer 203 is a silicon nitride layer. Any conventional deposition process, such as a chemical vapor deposition, a physical vapor deposition, or an atomic layer deposition process may be used to form the insulating layer. Insulating layer 203 is then patterned using a photolithography process and an etching process. For example, a patterned photoresist layer 211 is formed on the surface of insulating film 203, and the insulating layer is etched using the patterned photoresist layer as a mask to form a patterned insulating film 203. The patterned insulating film defines the size of the second combs. Insulating films 203 is configured to separate the end surface of the anode and cathode contacts.

Figure 3C:
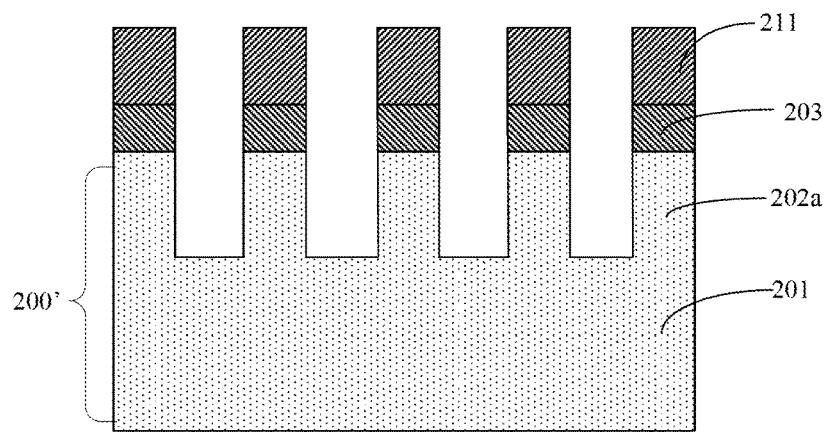

Next, referring to FIG. 3C, an exposed portion of second substrate 200' is etched to form the second combs 202a, which are perpendicular to a body portion 201 and arranged in the same direction at predetermined intervals.

In an exemplary embodiment, when the material of second substrate 200' is aluminum, a dry etching or a wet etching can be used. Dry etching may include a chlorine-based gas with added halide, e.g., a commonly used $BCl_3$, the etched depth corresponds to the height of the to-be-formed second combs.

The width of the openings formed after etching corresponds to the distance between two adjacent second combs. The distance between two adjacent second combs is greater than the sum of the comb width of the anodes and two times the thickness of graphene layer 103, in order to leave a space between the combs of the anodes and cathodes after assembly.

Figure 3D:
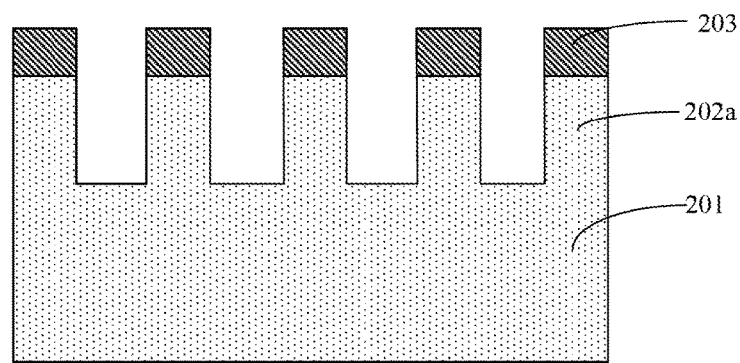

Next, referring to FIG. 3D, photoresist 211 is removed using a conventional removal process, such as an ashing process or a wet peeling process.

Figure 3E:
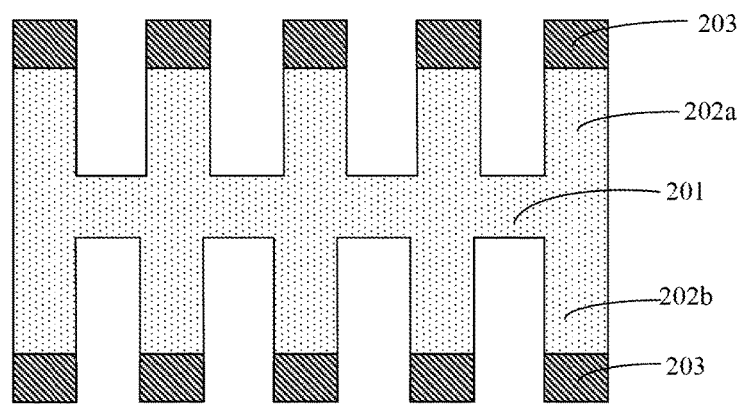

In an exemplary embodiment, referring to FIG. 3E, a plurality of combs can be formed on the back side of the second substrate. For example, a patterned insulating film 203 is formed on the back side of the second substrate, etching an exposed portion of the back side of the substrate to a predetermined depth to form multiple fourth combs 202b that are perpendicular to the body portion 201 of the second substrate. The processes for forming the fourth combs 202a are substantially similar to those of forming second combs 202a.

In some embodiments, the number of second combs 202a is equal to the number of fourth combs 202b. In addition, first combs 102a and third combs 102b may have the same size.

In other embodiments, the number of third combs 102b and the number of first combs 102a may differ.

The cathodes of the ultra-capacitor can thus be provided based on the above-described process steps.

Thereafter, the method for manufacturing the ultra-capacitor battery further includes:

S402: providing a hermetically sealed container enclosing the anodes and cathodes, the anodes and cathodes have combs interspersed with each other, and there is a space disposed between the interspersed combs.

Referring back to FIG. 1, the ultra-capacitor battery also includes a hermetically sealed container 300, in accordance with the present invention. The container can be made of a plastic or rubber material, a ceramic material, or a glass material, as known in the art. The anodes 100 and cathode 200 are enclosed in the hermetically sealed container and are alternately arranged. The combs associated with the anodes and cathodes are interspersed with each other, and there is a space (gap) between them.

The distance between two adjacent second combs 202a is greater than the sum of the width of a first comb 201a and two times the thickness of the graphene layer 103. The width between two adjacent first combs 201a is greater than the width of a second comb 202a.

The method also includes:

S403: filling the void of the hermetically sealed contained using an electrolyte solution.

Referring to FIG. 1, an electrolyte solution 301 is provided to fill gaps between the interspersed combs of the anodes and cathodes. The electrolyte solution 301 can be any suitable electrolyte solution known in the art. In a preferred embodiment, electrolyte solution 301 may include imidazole-$Al_2Cl_7$ and/or pyridine-$Al_2Cl_7$.

The ultra-capacitor battery of the present invention may be an aluminum ultra-capacitor battery. The method according to embodiments of the present invention may also include additional process step such as fixing and wiring steps, and the like.

In preferably embodiments, the manufacturing method is applicable to production of sub-micron ultra-capacitor batteries.

In summary, in accordance with the present invention, the ultra-capacitor battery manufactured by the disclosed method includes an ultra-capacitor cell having a cathode and an anode having interdigitated comb-like structure, so that the distance between the anodes and cathodes is significantly reduced. A graphene layer is formed on the comb-shaped substrate configured to operate as a cathode to increase the capacitance density, the ultra-capacitor battery has excellent properties.

The foregoing descriptions of specific embodiments of the present invention have been presented for purpose of illustration and description. They are not intended to be exhaustive or to limit the invention to the precise forms disclosed, and obviously many modifications and variations are possible in light of the above disclosure. The exemplary embodiment has been described in order to best explain the principles of the invention and its practical application. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. An ultra-capacitor battery comprising:
   a plurality of cathodes each comprising a first substrate having a first surface and a second surface opposite the first surface, a plurality of first combs extending perpendicularly to the first surface of the first substrate and arranged in a first direction at a first interval;
   a graphene layer on a surface of the first combs and on the first surface of the first substrate;
   a plurality of anodes each comprising a body portion and a plurality of second combs extending perpendicularly to a first side of the body portion and arranged in a second direction at a second interval, the first and second combs being interspersed between each other, and the first and second direction being parallel to each other;
   an air gap between the interspersed first and second combs;
   an insulting film on a distal end portion of each of the second combs;
   a hermetically sealed container enclosing the cathodes and the anodes; and
   an electrolyte solution filling the air gap and the container.

2. The ultra-capacitor battery of claim 1, further comprising:
   a plurality of third combs extending perpendicularly to the second surface of the first substrate and arranged in the first direction, wherein the graphene layer is disposed on a surface of the third combs and on the second surface of the first substrate.

3. The ultra-capacitor battery of claim 2, wherein a number of the third combs is equal to a number of the first combs.

4. The ultra-capacitor battery of claim 1, further comprising:
a plurality of fourth combs extending perpendicular to a second side of the body portion and arranged in the second direction, the second side being opposite to the first side, and the insulting film being disposed at a distal end portion of each of the fourth combs.

5. The ultra-capacitor battery of claim 4, wherein a number of the fourth combs is equal to a number of the second combs.

6. The ultra-capacitor battery of claim 1, wherein a width of a first comb is smaller than the second interval; and a width of a second comb is smaller than the first interval.

7. The ultra-capacitor battery of claim 2, wherein the first substrate, the first combs, and the third combs each comprise a material selected from the group consisting of Cu, Si, SiC and Sn.

8. The ultra-capacitor battery of claim 1, wherein the graphene layer comprises a multilayer graphene, or a mixture of graphene and graphite.

9. The ultra-capacitor battery of claim 1, wherein the electrolyte solution comprises imidazole-$Al_2Cl_7$, pyridine-$Al_2Cl_7$, or a combination thereof.

10. The ultra-capacitor battery of claim 1, wherein the plurality of anodes comprise a metal material.

11. The ultra-capacitor battery of claim 10, wherein the metal material comprises aluminum.

* * * * *